United States Patent [19]

Sashida et al.

[11] Patent Number: 4,803,611
[45] Date of Patent: Feb. 7, 1989

[54] APPARATUS FOR CORRECTING DC COMPONENT OF OUTPUT VOLTAGE IN INVERTER

[75] Inventors: Nobuo Sashida; Yushin Yamamoto, both of Hyogo, Japan

[73] Assignee: Mitsubishi Denki Kabushiki Kaisha, Tokyo, Japan

[21] Appl. No.: 108,126

[22] Filed: Oct. 14, 1987

[30] Foreign Application Priority Data

Feb. 12, 1987 [JP] Japan .................................. 62-28353

[51] Int. Cl.⁴ ........................ H02P 13/20; H02M 1/12
[52] U.S. Cl. ....................................... 363/98; 363/132
[58] Field of Search .................... 363/40–42, 363/95, 97, 98, 131, 132

[56] References Cited

U.S. PATENT DOCUMENTS

| | | | |
|---|---|---|---|
| 4,370,702 | 1/1983 | Shuey et al. | 363/98 X |
| 4,500,837 | 2/1985 | Shuey et al. | 363/97 X |
| 4,556,842 | 12/1985 | Rosswurm | 363/97 X |
| 4,739,464 | 4/1988 | Nishihiro et al. | 363/41 X |

FOREIGN PATENT DOCUMENTS 45-6728  3/1970  Japan .

OTHER PUBLICATIONS

IEEE Industry Applications Society, Chargerless UPS Using Multi-Functional BIMOS Inverter—Sinusoidal Voltage Waveform Inverter with Current Minor Loop, Sep. 28–Oct. 3, 1986, pp. 513–514.

Sekino et al., Inverter Output Voltage Waveform Closed-Loop Control Technique, IEEE 1983, pp. 205–212, 1983.

*Primary Examiner*—Patrick R. Salce
*Assistant Examiner*—Emanuel Todd Voeltz
*Attorney, Agent, or Firm*—Bernard, Rothwell & Brown

[57] ABSTRACT

Apparatus for correcting a DC component of an output voltage in an inverter, where correction is performed so that DC component contained in AC output voltage of an inverter main circuit is reduced. The apparatus is provided with a current detecting circuit constituted by, for example, a saturable reactor installed within an inverter control circuit to control operation of switching elements constituting the inverter main circuit and connected in parallel to the output terminal side of the inverter main circuit for detecting the current of the AC output of the inverter, and a polarity discrimination circuit for automatically discriminating both positive and negative polarities in the current at the output side of the inverter main circuit detected by the current detecting circuit and for generating a DC component correcting signal in the inverter control circuit. Only when a DC component is superposed to AC output and applied, the DC component is magnetically saturated at the DC side so that the DC component appearing on AC output of the inverter main circuit is corrected.

4 Claims, 6 Drawing Sheets

APPARATUS FOR CORRECTING DC COMPONENT OF OUTPUT VOLTAGE IN INVERTER

BACKGROUND OF THE INVENTION

1. Field of the Invention

The present invention relates to apparatus for correcting direct current (DC) component of output voltage in an inverter, wherein automatic correction is performed in an inverter as a power converting system to convert DC voltage into alternating current (AC) voltage so that DC component of the output voltage is reduced.

2. Description of the Prior Art

In recent years, variable speed operation and control of motors are becoming more important as one basic technology to support daily life and industrial production. An inverter constitutes the center roll in the variable speed control technology and enables the variable speed operation of motors. The inverter is being actively utilized together with the rapid development of the power and microelectronics accompanied by the improvement of reliability, operability and maintainability of technology. One of matters to be considered in utilizing such inverter is a countermeasure regarding elimination of DC component or harmonic component contained in AC voltage which is converted and outputted by the inverter. Such DC component or harmonic component in AC voltage makes unstable the operating state of, for example, a motor being supplied with power, and deteriorates reliability of the operation control by the inverter.

An example of the above-mentioned inverter application technology is disclosed in "Conference Record of the 1986 IEEE Industry Applications Society Annual Meeting Part I" p.513 "Chargerless UPS Using Multifunctional BIMOS Inverter - Sinusoidal voltage waveform inverter with current minor loop - ". Main circuit constitution of a voltage type inverter shown in FIG. 1 of this reference is illustrated in a part of FIG. 1 in the accompanying drawings of the invention. In FIG. 1, an inverter main circuit M is connected in parallel between DC power source 1 such as battery and output terminals 16a, 16b; in FIG. 1 the inverter is shown surrounded by a dash-and-dot line. The inverter main circuit M comprises, in the order from the power source side, a capacitor 2, inverer arms 3a, 3b, 3c and 3d constituted by parallel connection of NPN type transistors TR1, TR2, TR3 and TR4 and diodes D1, D2, D3 and D4, a transformer 4 connected to output side of the inverter arms 3a–3d, a reactor 5 connected to secondary side of the transformer 4, and a capacitor 6 connected also to secondary side of the transformer 4 in parallel connection. An inverter control circuit C, shown surrounded by dash-and-dot line in FIG. 1 is connected to lower side of the inverter main circuit M in FIG. 1. The inverter control circuit C comprises a voltage detector 7 such as a potential dividing resistor, an oscillator 8 for determining output frequency of the inverter main circuit M, a setting device 9 of voltage command value given from outside for determining output voltage value of the inverter main circuit M, a sinusoidal wave generator 10 for generating a sinusoidal wave as output voltage reference based on both the frequency set by the oscillator 8 and the voltage command value set by the voltage command value setting device 9, an adder-subtractor 11 for adding the signal produced by the polarity inversion of the output of the voltage detector 7 and the output signal of the sinusoidal wave generator 10, an error amplifier 12 connected to output side of the adder-subtractor 11, a triangular wave (carrier) oscillator 13 for determining the switching frequency of the arms 3a, 3b, 3c and 3d of the inverter main circuit M, a comparator 14 for comparing respective outputs of the error amplifier 12 and the triangular wave oscillator 13 and for generating ON/OFF signal for each of the transistors in the arms 3a, 3b, 3c and 3d, and a transistor drive circuit 15 for driving the transistors TR1–TR4 to constitute the pattern arms 3a –3d in response to the output signal of the comparator.

Operation of the inverter in the above-mentioned constitution will now be described. The transistors TR1, TR2, TR3 and TR4 constitute arms of so-called single phase bridge inverter, and have the basic function of converting DC voltage from the DC power source 1 into AC voltage. Assume that one AC terminal to which emitter of the transistor TR1 and collector of the transistor TR2 are connected is made U, and other terminal to which emitter of the transistor TR3 and collector of the transistor TR4 are connected is made V. While the arm 3a and the arm 3d are simultaneously turned on, the arm 3b and the arm 3c are turned off. Then, positive potential is applied to the terminal U, and negative potential is applied to the terminal V. In reverse, when the arms 3b and 3c are turned on and the arms 3a and 3d are turned off, negative potential is applied to the terminal U and positive potential is applied to the terminal V.

Switching of respective arms is performed at a frequency several times higher than AC output frequency (e.g., commercial frequency) of the inverter and moreover the conduction time of each arm is set to a suitable time and controlled; thereby a prescribed inverter output voltage can be obtained. Such an inverter is generally called an inverter of a pulse width modulation (PWM) system. The capacitor 2 is a filter to remove harmonic ripple current flowing through the DC circuit, and the reactor 5 and the capacitor 6 constitute a filter to remove harmonic component contained in the AC output voltage. Further, the diodes D1–D4 become conductive when regenerative current in each arm flows from AC side to DC side, and are connected in parallel to each transistor in the reverse direction to the conductive direction of each transistor. Output voltage of the inverter main circuit M is transformed by the transformer 4 into a suitable voltage for various loads (not shown).

On the other hand, the inverter control circuit C constitutes PWM control circuit in a triangular wave comparison system, and AC output voltage of the inverter is controlled so that its frequency is determined by the oscillator 8 and amount of the voltage is determined by the voltage command value from outside. The sinusoidal wave generator 10 generates a sinusoidal wave signal whose frequency is determined by the oscillator 8 and amount of the voltage is determined by the voltage command value set by the voltage command value setting device 9. The voltage detector 7 is constituted by potential dividing resistor or the like as above described, and when output voltage of the inverter is supplied to the control circuit C the output voltage is divided and a suitable voltage level and output voltage signal are generated. The adder-subtractor 11 subtracts the output voltage signal from the sinusoidal wave signal and generates an error signal. The error amplifier 12 amplifies the error signal by suitable transfer function and generates a voltage reference signal.

The triangular wave oscillator 13 oscillates a reference triangular wave voltage signal to determine switching frequency and switching time-point of the transistors in the arms 3a, 3b, 3c and 3d. The comparator 14 compares the voltage reference signal and the reference triangular wave signal in amount, and further performs correction with shortcircuit prevention time so that the arms in series connection, more specifically two series bodies of the transistors TR1, TR2 and the transistors TR3, TR4 are not simultaneously rendered conductive, and generates the switching command signal. The switching command signal is insulated by a photo coupler or the like installed in the drive circuit 15, and further amplified to a current having sufficient magnitude to perform ON/OFF operation of the transistors and supplied as base current to each transistor. Thus the inverter converts DC voltage from the DC source 1 into AC voltage controlled by the command value of the voltage command value setting device 9 and the frequency of the oscillator 8, and outputs the AC voltage to the output terminals 16a, 16b.

Since the apparatus for correcting the DC component of the output voltage in the inverter of the prior art is constituted as above described, the AC output voltage inevitably contains a DC component due to variation of the voltage drop of each arm of the inverter main circuit or variation of conduction time of the transistors. For example, if sum of the voltage drop of the transistors TR1 and TR4 (collector-emitter voltage of transistors during conduction) is less than the sum of the voltage drop of the transistors TR2 and TR3, it follows that the AC output voltage of the inverter contains DC voltage of positive polarity even if the conduction time of respective arms is equal in symmetry. On the other hand, if the conduction time of the transistors TR1 and TR4 is longer than the conduction time of the transistors TR2 and TR3 due to difference in characteristics of the transistor drive circuit 15, DC voltage of positive polarity is superposed to the AC output voltage also in this case.

A problem exists also in that the above-mentioned DC component causes DC eccentric magnetization of the transformer as load connected to output side of the inverter main circuit and excessive current flows. Since such DC component is generated due to variation in characteristics of the transistor itself or of the transistor drive circuit or the like, when the amount of the output voltage of the inverter is varied or a transistor is exchanged, the DC component appearing in the AC output varies and therefore it is difficult to decrease the DC component only by adjusting the inverter control circuit.

Also in the inverter main circuit in the prior art, in order that the DC component is not outputted, the transformer 4 is connected between the output terminals 16a, 16b and a gap is provided in the core of the transformer 4 and a special leakage transformer must be used so that the exciting current becomes larger than current flowing due to the DC voltage contained in the inverter output voltage. Consequently, a relatively cheap transformer having ordinary characteristics cannot be used. Even if the voltage need not be transformed, the inverter device cannot be constituted without using the transformer.

SUMMARY OF THE INVENTION

An object of the invention is to provide apparatus for correcting the DC component of the output voltage in an inverter, which can detect DC component in the inverter output voltage and automatically correct the DC component to be reduced.

Another object of the invention is to provide apparatus for correcting the DC component of the output voltage in an inverter, which can prevent the DC eccentrix magnetization accompanied by excessive current flowing due to the DC component at the AC output side of the inverter because of variation of characteristics of transistors or the like and also can remove the DC component merely by adjusting the inverter control circuit irrespective of exchange of transistors or the like.

A third object of the invention is to provide apparatus for correcting the DC component of the output voltage in an inverter, wherein, in order to avoid influence by the DC component produced at the inverter main circuit side, the transformer installed at the AC output side of the inverter need not be of special structure, for example, a leakage transformer, but the DC component contained in the AC voltage can be removed even by a general-purpose transformer of low cost.

In order to attain the foregoing objects, DC component compensation apparatus of inverter output voltage according to the invention comprises current detecting means, such as a saturable reactor, connected in parallel to the output end of the inverter main circuit for detecting current at the output end, and polarity discriminating means with a photo coupler for automatically discriminating the current polarity at the output end side of the inverter main circuit detected by the current detecting means, so that the polarity discriminating means generates the correction output of the inverter control circuit. cl BRIEF DESCRIPTION OF THE DRAWINGS FIG. 1. is a block constitution diagram showing an example of an inverter device in the prior art;

DETAILED DESCRIPTION OF THE PREFERRED EMBODIMENTS

Apparatuses for correcting a DC component of the output voltage in an inverter as preferred embodiments of the invention will now be described in detail referring to the accompanying drawings.

Figure 1:
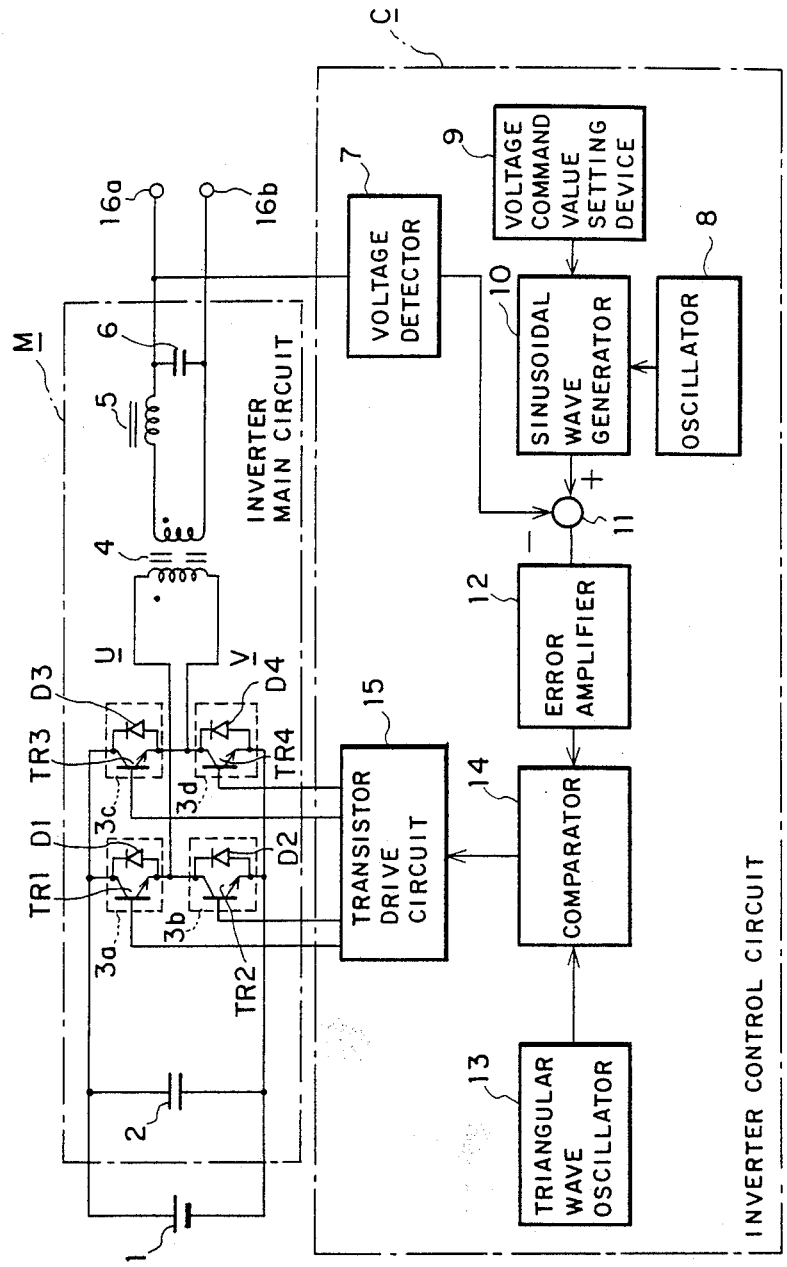

FIGS. 2–6 illustrate an embodiment of the invention, and parts designated by the same reference numerals as those in FIG. 1 illustrating a conventional apparatus are the same or equivalent parts to those in FIG. 1. As clearly seen in FIG. 2, the inverter device of this invention has features different from those of the prior art in constitution of an inverter control circuit. That is, the inverter control circuit comprises a saturable reactor 20 as a current detecting means with one end connected to one output end 16a (designated by symbol A) of the inverter, a resistor 21 connected between other end of the saturable reactor 20 and the other output end 16b (designated by symbol B) of the inverter output, and photo couplers 22 and 23 as polarity discriminating means which are composed of two light emission diodes D22, D23 connected in parallel to the resistor 21 and two transistors TR22, TR23 combined respectively with the light emission diodes D22, D23, and connected in the reverse parallel connection of polarity in respective input sides. The emitter side of the transistor TR22 is connected to collector side of the transistor TR23. A resistor 24 having a resistance value $R_1$ is connected between the collector of the transistor TR22 of the photo coupler 22 and the positive polarity side of the power source, of the control circuit and a resistor 25 having an equal resistance value $R_1$ to that of the resistor 24 is connected between the emitter of the transistor TR23 and the negative polarity side of the power source. Resistors 26, 27 having resistance values $R_2$, $R_2$ are connected in parallel between the collector and the emitter of the transistors TR22, TR23 respectively. An operational amplifier 28 is connected to the joint of the resistors 26 and 27 through an input resistor 29 having a resistance value $R_i$ and a capacitor 30 for feedback having capacitance $C_f$ is provided at the operational amplifier 28. Output of the operational amplifier 28 is inputted as adding input to the adder-subtractor 11.

Figure 3:
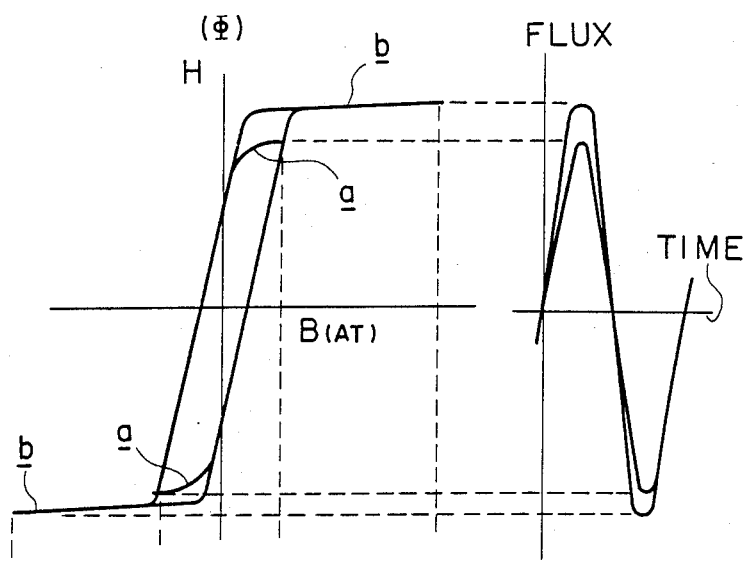
FIG. 3 is a characteristic diagram illustrating saturation characteristics of a saturable reactor.

Operation of the inverter device based on the above constitution will be described. First, the saturable reactor 20 has magnetomotive force—magnetic flux density (B−H) characteristic curve as shown in FIG. 3. When magnetic flux smaller than the saturation flux density inherent to the core is produced, for example, when AC voltage having arc-shaped characteristics as shown in FIG. 3 is applied, only exciting current shown as characteristic curve a in FIG. 4 flows and the flux density H is not saturated.

The resistance value Rs of the resistor 21 is selected from the peak value $I_{ex}$ of the exciting current and the threshold value $V_F$ corresponding to the forward voltage drop of the photo couplers 22, 23 according to following formula (1).

$$R_s < \frac{V_F}{I_{ex}} \quad (1)$$

That is, since the exciting current of the saturable reactor 20 is bypassed by the resistor 21, if current is smaller than the peak value $I_{ex}$ of the exciting current, the photo couplers 22, 23 are not turned on.

In this state, voltage $V_i$ applied to the emitter (hereinafter referred to as "c point") of the transistor TR22 of the photo coupler 22, i.e., the input resistor 29 of the operational amplifier 28 is expressed by following formula (2) assuming that the power source voltage values at the positive polarity side and the negative polarity side be made $V_P$, $V_N$ respectively.

$$V_i = (V_P + V_N) \frac{(R_1 + R_2)}{2 \times (R_1 + R_2)} = \frac{V_P + V_N}{2} \quad (2)$$

If the power source voltages $V_N$, $V_P$ at both positive and negative electrode sides have relation $V_N = -V_P$, it follows that $$V_i = 0 \quad (3)$$

That is, since there is no input voltage of the operational amplifier 28, the output voltage also becomes zero.

Figure 4:
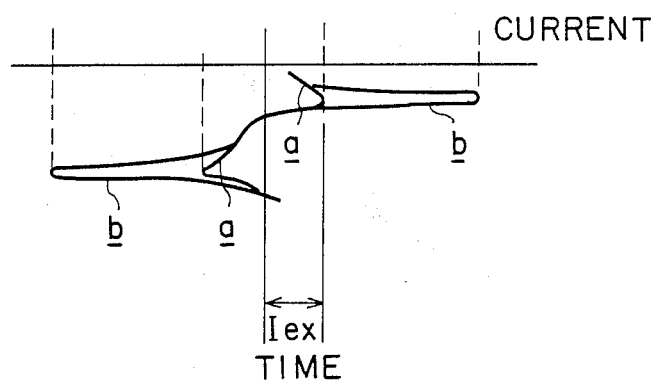
FIG. 4 is a waveform chart illustrating waveform characteristics of exciting current in the inverter device of FIG. 2.

If the output voltage of the inverter, i.e., the AC voltage remaining symmetric in positive and negative polarities and applied to the saturable reactor 20 becomes larger than the saturation level, the reactor is saturated in the vicinity of the maximum value of the flux density as shown in characteristic curve b in FIG. 3 and current flows as shown in FIG. 4. The photo couplers 22, 23 perform electric insulation between the main circuit M and the control circuit C in the inverter or for removal of noise. The above operation will be described in further detail referring to FIG. 5.

When the inverter output voltage is a sinusoidal wave AC voltage v(t) shown in FIG. 5(a), assuming that the number of turns of the reactor be n, the core sectional area be S, and the flux be $\phi$, the flux density $\phi$ becomes $$\Phi = \frac{\phi}{S} = \frac{1}{S} \int \frac{v(t)}{n} dt = \frac{1}{S \cdot n} \int v(t) dt \quad (4)$$

Figure 5:
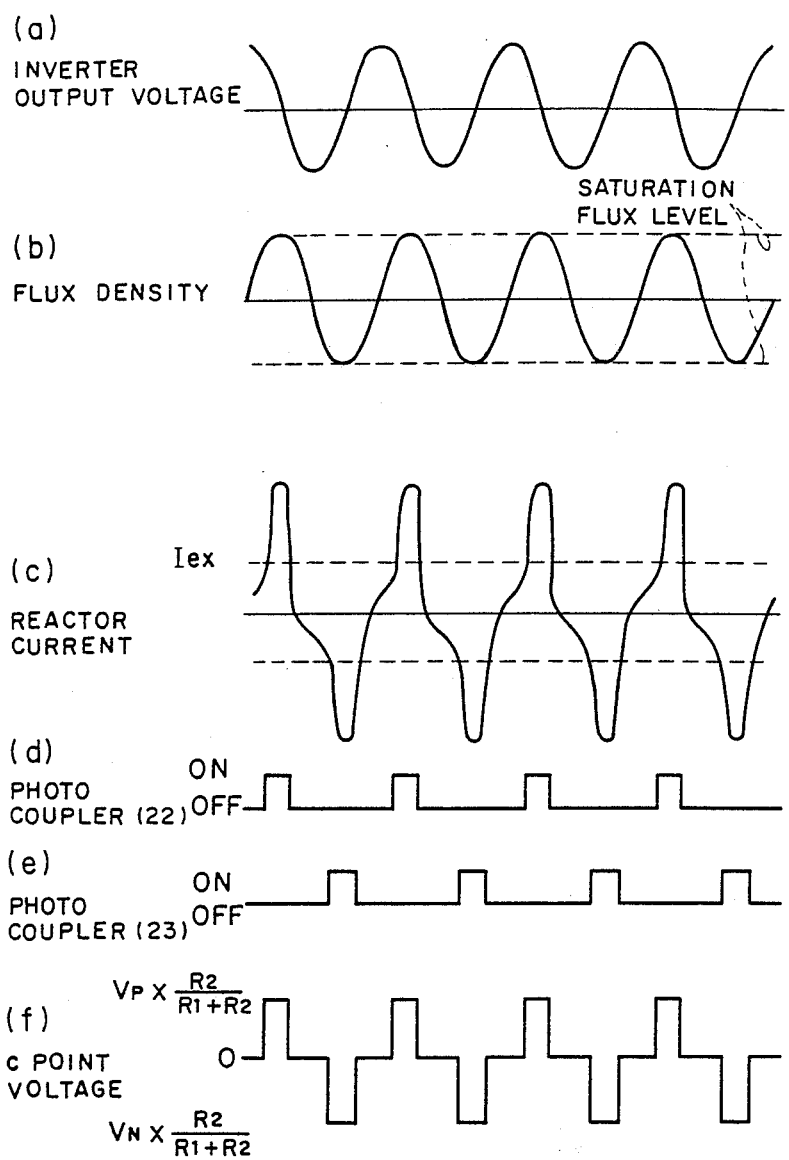
FIG. 5 is a characteristic diagram illustrating output characteristics in each part of the inverter.
Figure 6:
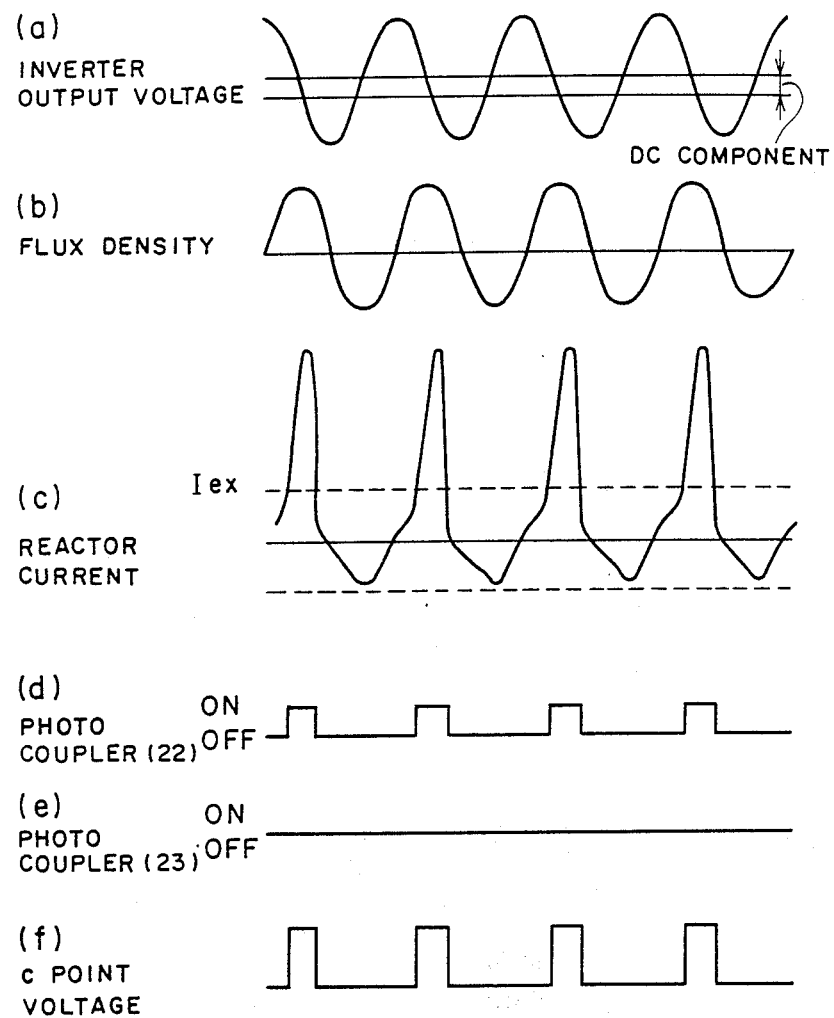
FIG. 6 is a characteristic diagram illustrating output characteristics when a DC component is contained in inverter output voltage.

If the maximum value of the flux density approaches the saturation flux density of the core of the reactor, large reactor a current will suddenly flow as shown in FIG. 5(c). When the reactor current is larger than the threshold value $I_{ex}$ determined by the resistance value Rs of the resistor 21 and the forward voltage drop of the photo coupler, among the photo couplers 22 and 23, only one photo coupler with corresponding polarity is only turned on. As shown in FIGS. 5 (d), (e), when the reactor current is positive, the photo coupler 22 is turned on; when it is negative, the photo coupler 23 is turned on.

If the photo couplers 22 and 23 have substantially equal characteristics in this case, voltage at the c point becomes $$"V_P \times \frac{R_2}{R_1 + R_2}" \text{ or } "V_N \times \frac{R_2}{R_1 + R_2}"$$

when the photo coupler 22 or 23 is turned on, and it becomes zero when the photo coupler are turned off. This result in the voltage being symmetric in positive and negative polarity as shown in FIG. 5(f).

If the inte time constant of the operational amplifier defined by "$t = R_i \times C_f$" is selected sufficiently longer than the period of the power source voltage, the output voltage of the operational amplifier 28 will be substantially zero.

Next, will be described the case where a DC component is contained in the inverter output voltage due to the above-mentioned reason. As shown in FIG. 6(a), the inverter output voltage is superposed by a DC component as illustrated. The flux density of the reactor shown in FIG. 6(b) approaches the saturation level at the positive polarity only, and the reactor current shown in FIG. 6(c) becomes large at one side direction only. In this case, only the photo coupler 22 is turned on, and the voltage at the c point becomes a voltage waveform of pulse shape in positive polarity as shown in FIG. 6(f), thereby the inverted voltage of negative polarity is integrated and outputted at output of the operational amplifier 28.

Figure 2:
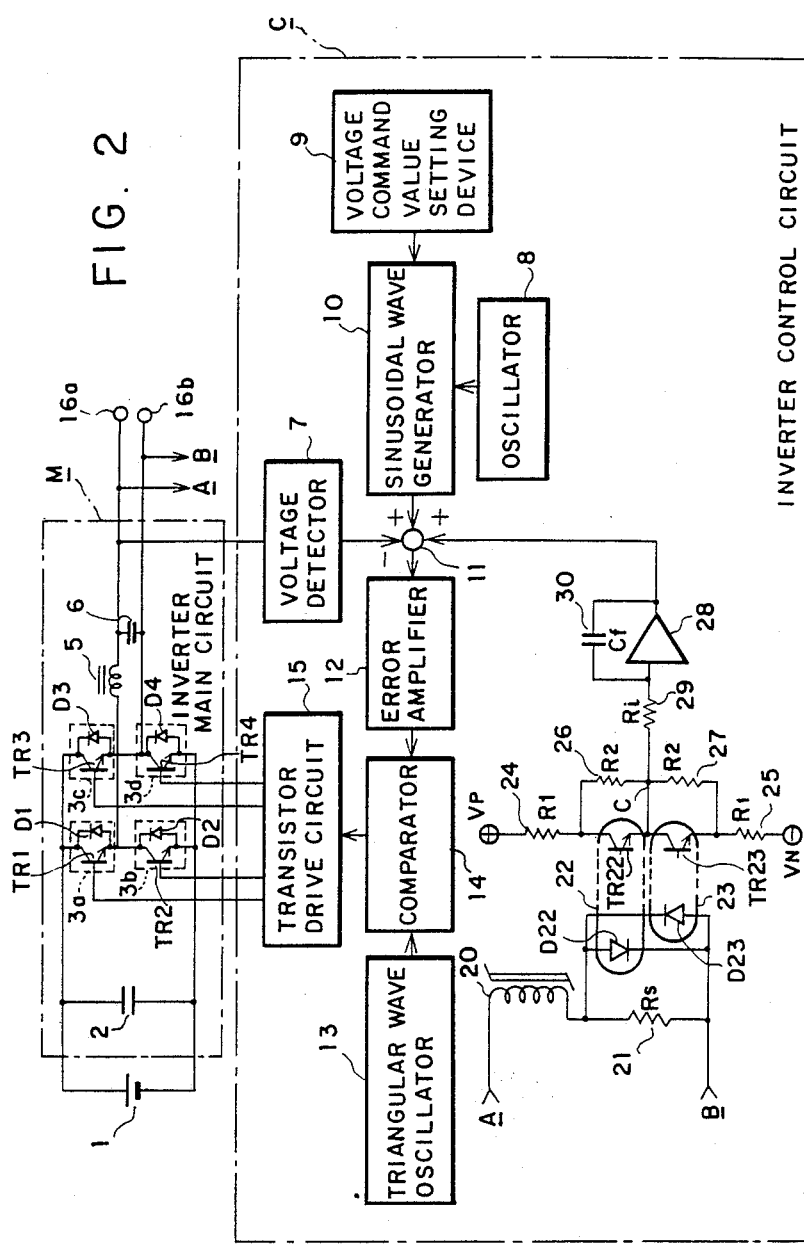
FIG. 2 is a block constitution diagram showing apparatus for correcting the DC component of the output voltage in an inverter as an embodiment of the invention.

Since this voltage is added to the sinusoidal wave signal by the adder-subtractor 11 shown in FIG. 2 and acts to shift the input to the comparator 14 to negative side, the DC component of the inverter is corrected and decreased. In other words, this circuit constitutes a feedback control system whereby the DC component in the output voltage of the inverter is always controlled to become zero.

Figure 7:
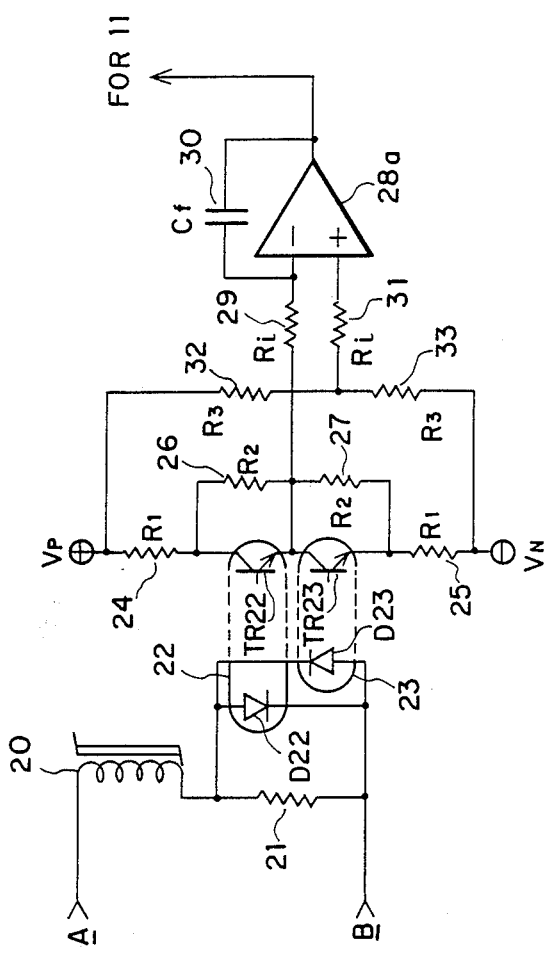
FIG. 7 is a block constitution diagram showing apparatus for correcting DC component of output voltage in an inverter as another embodiment of the invention.

Next, apparatus for correcting the DC component of output voltage in an inverter as another embodiment of the invention will be described referring to FIG. 7. FIG. 7 shows only the essential part in the control circuit of the inverter, and parts designated by the same reference numerals as those of the embodiment in FIG. 2 are the same or equivalent parts. That is, constitution of each of members designated by numerals 20-27 and 29 is not changed. In FIG. 7, the joint between emitter of the transistor TR22 and collector of the transistor TR23 is connected to the inverted input terminal of an operational amplifier 28a having differential input through the input resistor 29 having the resistance value $R_i$. The non inverted input terminal of the operational amplifier 28a is connected through an input resistor 31 having the resistance value $R_i$ to the joint of potential dividing resistors 32, 33. Each of the potential dividing resistors 32, 33 has resistance value $R_3$, and one side of the resistor 32 is connected to the junction between the positive power source and the resistor 24 and one side of the resistor 33 is connected to the junction between the negative power source and the resistor 25.

Operation of the inverter having the control circuit of the above constitution will be described. In this embodiment, when the transistors TR22, TR23 of the photo couplers 22, 23 are turned off, any of the differential input terminals of the operational amplifier 28a is connected so as to have potential of the positive and negative power source voltages $V_P$, $V_N$ divided by the resistors 32, 33. Consequently, even if the power source voltage is inconsistent in positive and negative polarities, influence does not appear at the output of the operational amplifier 28a. That is, according to this embodiment, a mistaken detection of voltage due to variation of the power source voltage can be avoided.

As above described in detail, according to the apparatus for correcting the DC component of output voltage in the inverter of the invention, the DC component contained in the output voltage of the inverter is detected using the saturable reactor, and the detecting current is automatically fed back to the inverter main circuit through the inverter control circuit a thereby the DC component is corrected. Consequently, a special leakage transformer installed at side of the inverter main circuit becomes unnecessary, and a transformer having ordinary exciting characteristics may be used, and moreover when the circuit elements to constitute the inverter main circuit are exchanged or these elements are subjected to variation of the characteristics due to the time lapse, the inverter control circuit need not be readjusted.

What is claimed is:

1. Apparatus for correcting a DC component of an output voltage in an inverter, wherein a DC power source is converted into AC voltage by an inverter main circuit, the output voltage of the inverter main circuit is detected by a voltage detector, and an input signal to correct the DC component is outputted through an inverter control circuit to the inverter main circuit, said apparatus being provided in the inverter control circuit with:

current detecting means connected in parallel to output of the inverter main circuit; and polarity discrimination means for automatically discriminating polarity of current flowing through the current detecting means and for supplying the inverter control circuit with said DC component correcting signal;

said current detecting means being constituted by a saturable reactor connected to one output end of the inverter main circuit.

2. Apparatus for correcting a DC component of an output voltage in an inverter as set forth in claim 1, wherein said current detecting means is constituted by a saturable reactor disposed at one output end of the inverter main circuit, and said polarity discrimination means is constituted by two sets of photo couplers having a function of discrimination the direction of current flowing through the saturable reactor.

3. Apparatus for correcting a DC component of an output voltage in an inverter as set forth in claim 2.

wherein said two sets of photo couplers are constituted by a first coupler comprising a first transistor connected in series between two power sources having equal voltage value and both positive and negative polarities and a first light emission diode connected in parallel to a resistor for detecting exciting current connected in series to one end of the saturable reactor, and a second photo coupler comprising a second transistor with its collector connected in series to the emitter of the first transistor and a second light emission diode connected to the first light emission diode in reverse parallel connection, said emitter of said first transistor and said collector of said second transistor being connected to a common junction; and two resistors having equal resistance values are connected in parallel between the collector and the emitter of respective transistors with one end of each of said resistors being connected to said common junction, and an output at said common junction of the two transistors is inputted through said common junction of the two resistors to an operational amplifier for outputting a DC component correction signal within the inverter control circuit.

4. Apparatus for correcting a DC component of an output voltage in an inverter as set forth in claim 2, wherein said two sets of photo couplers are constituted by a first coupler comprising a first transistor connected in series between two power sources having equal voltage value and both positive and negative polarities and a first light emission diode connected in parallel to a resistor for detecting exciting current connected in series to one end of the saturable reactor, and a second photo coupler comprising a second transistor with its collector connected in series to the emitter of the first transistor and a second light emission diode connected to the first light emission diode in reverse parallel connection, said emitter of said first transistor and said collector of said second transistor being connected to a common junction;

two resistors having equal resistance values and constituting a first resistor series member are connected in parallel to said transistors between the collector and the emitter of the respective transistors with one end of each of said resistors being connected to said common junction, and an output at said common junction of the two transistors is inputted through said common junction of the first resistor series member to an inverted input side of a comparison operational amplifier having two differential inputs; and a series member of said first and second transistors in series connection and a second resistor series member comprising two potential dividing resistors having equal resistance values are connected in parallel between said respective power sources of both positive and negative polarities, one end of each of said resistors of said second resistor series member being connected to a second common junction, and the output is inputted to a non-inverted input of the comparison operational amplifier.

* * * * *

UNITED STATES PATENT AND TRADEMARK OFFICE
CERTIFICATE OF CORRECTION

PATENT NO. : 4,803,611

DATED : February 7, 1989

INVENTOR(S) : Nobuo Sashida et al.

It is certified that error appears in the above-identified patent and that said Letters Patent is hereby corrected as shown below:

```
Column 1, line 48, "inverer" should be --inverter--.
Column 3, line 32, after "if" insert --the--.
Column 4, line 38, delete "cl";
         lines 38-39, "BRIEF DESCRIPTION OF THE DRAWINGS" should have
been printed as a heading.
Column 5, line 17, after "in" (second occurrence) insert --the--;
         line 43, "characteristicsas" should be --characteristics as--.
Column 6, line 35, after "reactor," insert --a--;
         line 54, "coupler" should be --couplers--;
         line 55, after "This" insert --will--;
         line 57, "inte" should be --integration--.
Column 7, line 58, cancel "a" and after "circuit" (second occurrence)
insert --;--.

Column 6, line 36, delete "a".
```

Signed and Sealed this

Thirteenth Day of February, 1990

*Attest:*

JEFFREY M. SAMUELS

*Attesting Officer*   *Acting Commissioner of Patents and Trademarks*